(12) United States Patent
Zhang et al.

(10) Patent No.: US 12,235,821 B2
(45) Date of Patent: Feb. 25, 2025

(54) R-TREE INDEX MERGING AND UPDATING METHOD AND APPARATUS BASED ON HILBERT CURVE, AND MEDIUM

(71) Applicant: ZHEJIANG UNIVERSITY, Zhejiang (CN)

(72) Inventors: Feng Zhang, Hangzhou (CN); Bozhi Qian, Hangzhou (CN); Yuanyuan Wang, Hangzhou (CN); Linshu Hu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/185,410

(22) Filed: Mar. 17, 2023

(65) Prior Publication Data

US 2023/0281182 A1    Sep. 7, 2023

Related U.S. Application Data

(63) Continuation of application No. PCT/CN2020/121521, filed on Oct. 16, 2020.

(30) Foreign Application Priority Data

Sep. 25, 2020   (CN) .......................... 202011026535.8

(51) Int. Cl.
*G06F 7/00*       (2006.01)
*G06F 16/22*      (2019.01)

(52) U.S. Cl.
CPC ...... *G06F 16/2272* (2019.01); *G06F 16/2246* (2019.01)

(58) Field of Classification Search
CPC ............. G06F 16/2272; G06F 16/9027; G06F 16/2246; G06F 16/2465; G06F 16/287;
(Continued)

(56) References Cited

U.S. PATENT DOCUMENTS 9,477,745 B2 * 10/2016 Tyercha ............. G06F 16/2465
2003/0004938 A1   1/2003 Lawder
(Continued)

FOREIGN PATENT DOCUMENTS

CN         103617162 A     3/2014
CN         104408039 A     3/2015
(Continued)

OTHER PUBLICATIONS

International Search Report (PCT/CN2020/121521); Date of Mailing: Jun. 23, 2021.
(Continued)

*Primary Examiner* — Mohammad A Sana
(74) *Attorney, Agent, or Firm* — W&G Law Group (57) ABSTRACT

An R-tree index merging and updating method and apparatus based on a Hilbert curve, and a medium. The method comprises: S1, acquiring a first R-tree to be merged and a second R-tree into which the first R-tree is to be inserted; S2, querying a node for insertion, for each merged leaf node in a leaf node level of the first R-tree by means of a "top to bottom" hierarchical query algorithm; S3, inserting, according to an order of the Hilbert values, spatial objects included in each leaf node in the first R-tree into the node for insertion that is determined in S2, thereby merging the two R-trees; and S4, for the second R-tree after merging, updating information stored in each node level by level according to an order from a leaf node to a root node.

8 Claims, 5 Drawing Sheets

(58) Field of Classification Search
CPC ...... G06F 16/901; G06F 16/22; G06F 16/221; G06F 16/285; G06F 16/86; G06F 16/29
See application file for complete search history.

(56) References Cited

U.S. PATENT DOCUMENTS

| | | | |
|---|---|---|---|
| 2007/0198568 A1 | 8/2007 | Luo et al. | |
| 2014/0245127 A1 | 8/2014 | Brenzel et al. | |
| 2015/0046411 A1 | 2/2015 | Kazmaier | |
| 2015/0324373 A1* | 11/2015 | Tyercha | G06F 16/9537 707/722 |
| 2016/0004762 A1* | 1/2016 | Tyercha | G06F 16/221 707/737 |
| 2019/0180844 A1* | 6/2019 | Jung | G06N 3/045 |

FOREIGN PATENT DOCUMENTS

| | | |
|---|---|---|
| CN | 104731984 A | 6/2015 |
| CN | 104933189 A | 9/2015 |
| CN | 109582677 A | 4/2019 |
| CN | 109978274 A | 7/2019 |
| CN | 110059067 A | 7/2019 |
| IN | 105828292 A | 8/2016 |
| JP | 2013164813 A | 8/2013 |
| JP | 2015055914 A | 3/2015 |
| JP | 2018045286 A | 3/2018 |
| JP | 2020135530 A | 8/2020 |

OTHER PUBLICATIONS

CN Notice Of Allowance(CN202011026535.8); Date of Mailing: May 23, 2022.
Parallel-Spatial-Index-Algorithm-Based-on-Hilbert-Partition; Date of Mailing: Jan. 31, 2014.
A-lgorithm-for-GeneratingN-dimensional-Hibert-Curve; Date of Mailing: Aug. 31, 2006.
Hilbert-R-tree-An-Improved-R-tree-Using-Fractals; Date of Mailing: Mar. 16, 2018.
Research-on-A-Method-of-Vector-Data-Fast-Scheduling; Date of Mailing: Dec. 31, 2013.
Japanese Office Action for Application No. 2023-519043, mailed Jun. 21, 2024 (16 pages).

* cited by examiner

R-TREE INDEX MERGING AND UPDATING METHOD AND APPARATUS BASED ON HILBERT CURVE, AND MEDIUM

CROSS-REFERENCE TO RELATED APPLICATIONS

The present application is a continuation of International Application No. PCT/CN2020/121521, filed on Oct. 16, 2020, which claims priority to Chinese Application No. 202011026535.8, filed on Sep. 25, 2020, the contents of both of which are incorporated herein by reference in their entireties.

TECHNICAL FIELD

The present application relates to the technical field of data retrieval and updating, in particular to a merging and updating technology for Hilbert R-tree indexes.

BACKGROUND

With the development of geographic data acquisition equipment, the updating frequency of spatial data is gradually increasing. The management of spatial data should not only meet the needs of efficient query, but also take into account the needs of rapid updating.

Spatial index combined with an LSM tree structure can effectively support the frequent insertion and update of spatial data, among which LSM R-tree index has better universality and stability than a DBH tree, a DHVB tree and an SHB tree. However, the practical application of an LSM R-tree often involves a large number of R-tree merging operations. In the process of merging, a R-tree will occupy a certain amount of memory and computing resources of the system, which will affect the efficiency of operations such as querying, inserting and deleting indexes during this period. Therefore, an efficient Hilbert R-tree merging algorithm is demanded to improve the usability of the LSM R-tree as a whole by improving the R-tree merging efficiency.

SUMMARY

It is an object of the present application to overcome the shortcomings of index updating efficiency and query efficiency when high-frequency spatio-temporal data are inserted in the prior art by providing an improved R-tree index based on a Hilbert curve.

The specific technical solution adopted by the present application is as follows:

An R-tree index merging and updating method based on a Hilbert curve includes the following steps of:

S1, acquiring a first R-tree to be merged and a second R-tree into which the first R-tree is to be inserted. The height of the first R-tree is not greater than that of the second R-tree.

Each leaf node stores minimal bounding rectangles of spatial objects and the primary key pointers of the spatial objects. Each non-leaf node stores minimal bounding rectangles of all child nodes, a primary key pointer set of all child nodes, maximum Hilbert values of all spatial objects in the minimal bounding rectangle and minimum Hilbert values of all spatial objects in the minimal bounding rectangle;

S2, querying to obtain a node to be inserted into a leaf node level of the second R-tree, for each merged leaf node in a leaf node level of the first R-tree, according to a level-by-level order from a root node level to a leaf node level based on Hilbert value information stored in each node S3, inserting, according to an order of the Hilbert values, the spatial objects included in each leaf node in the first R-tree into the node to be inserted that is determined in S2, thereby merging the second R-trees.

If a capacity of the leaf node overflows during the merging process, the second R-tree needs to be split, and all spatial objects contained in the first R-tree and the second R-tree are redistributed to all leaf nodes of the split second R-tree according to the order of Hilbert values; and S4: updating the information stored in each node level by level according to an order from the leaf nodes to the root node for the second R-tree merged with the first R-tree.

Compared with the prior art, the present application has the following beneficial effects.

According to the present application, by means of a "top to bottom" hierarchical query algorithm and a "bottom to top" hierarchical adjustment algorithm, the Hilbert R-trees can be quickly merged and updated. In the process of merging, each node to be inserted will only be read once, and each node will only be written and split once. Compared with the method of one-by-one insertion, the times of reading and writing disks are greatly reduced, the merging efficiency of Hilbert R-trees is improved, and the impact of R-tree merging on the overall spatial index operation is reduced. At the same time, the improved Hilbert R-tree adopts the method of batch insertion and even splitting, which can also improve the filling rate of nodes and the space utilization rate of the R-tree to a certain extent, therefore the query efficiency can also be improved to some extent.

DESCRIPTION OF EMBODIMENTS

The present application will be further elaborated and explained with reference to the attached drawings and specific embodiments. The technical features of each embodiment of the present application can be combined accordingly without conflicting with each other.

In the process of R-tree merging, a certain amount of memory and computing resources of the system will be occupied, which will affect the efficiency of operations such as querying, inserting and deleting indexes during this period. Therefore, an efficient merging method of Hilbert R-trees can reduce the above-mentioned situations and improve the query efficiency of tree spatial index as a whole. In the present application, the traditional Hilbert R-tree structure is improved, and a merging method based on the improved Hilbert R-tree is designed to realize efficient merging of Hilbert R-trees.

Figure 1:
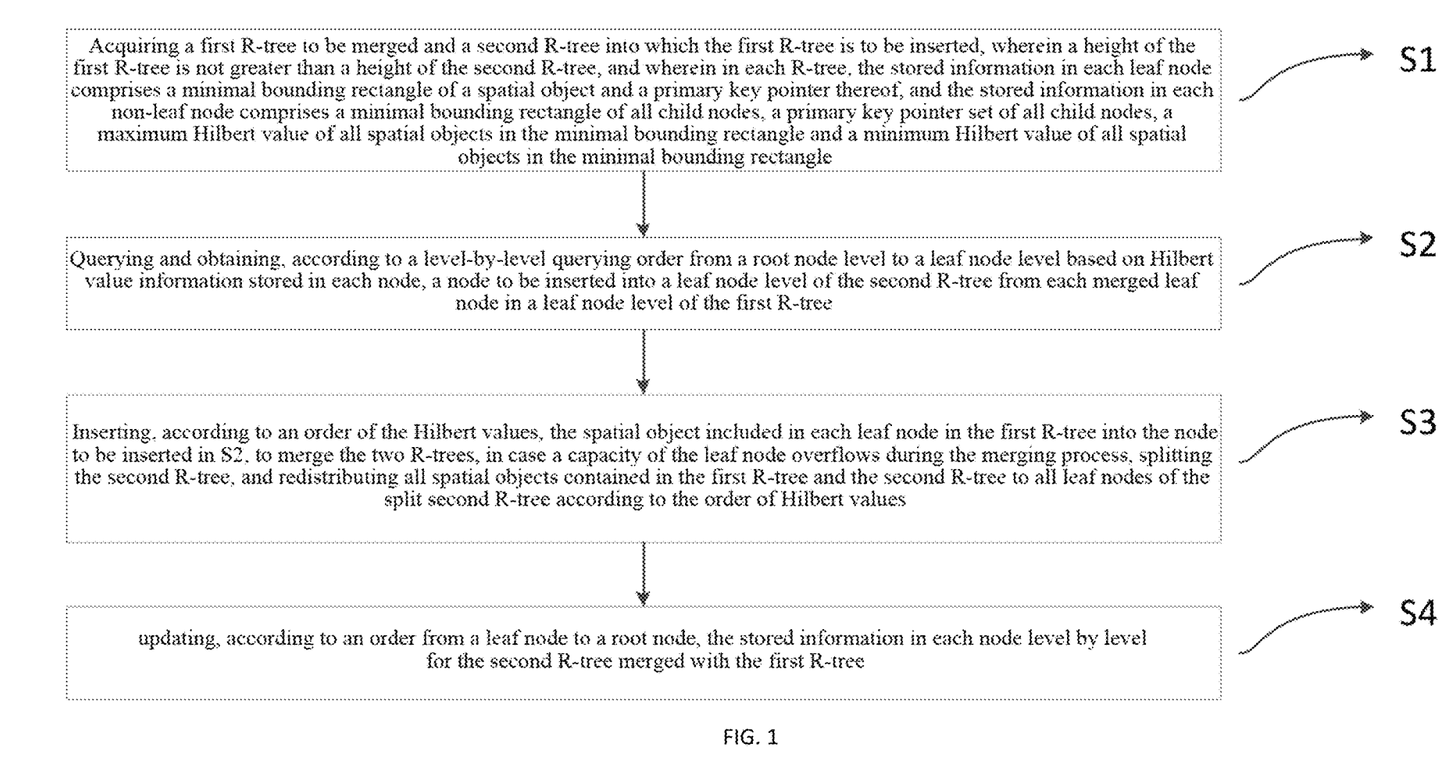
FIG. 1 illustrates a spatial Hilbert filling curve.

As shown in FIG. 1, in a preferred embodiment of the present application, an R-tree index merging and updating method based on a Hilbert curve is provided, which includes the following steps.

In S1, firstly, two R-trees are obtained, namely the first R-tree to be merged and the second R-tree into which the first R-tree is to be inserted. For convenience of description, the first R-tree is denoted as $R_1$ and the second R-tree is denoted as $R_2$. Since index merging is from a low level to a high level, the height of the tree $R_2$ must be greater than or equal to that of the tree $R_1$.

The tree $R_1$ and the tree $R_2$ in the present application are both improved Hilbert R-trees, and the basic structures of the two R-trees are the same. In order to unify the meaning of nouns, leaf nodes of the R-tree are defined as nodes without child nodes in the R-tree, that is, the last level of nodes; root node of the R-tree are the first-level nodes in the R-tree, that is, the top-level nodes; the hierarchy of nodes in the R-tree are as follows: starting from the root node, the level of the root node is set as the first level, the level of the child nodes of the root node is set as the second level, and so on. If the level of a node is the $L^{th}$ level, the level of its child nodes is the $L+1^{th}$ level; the height of the R-tree is the maximum value of the levels of all nodes in the R-tree.

In each R-tree, the structure of an improved leaf node $C_1$ of a Hilbert R-tree is consistent with that of the leaf node of a conventional Hilbert R-tree, and the information stored in each leaf node is the minimal bounding rectangles of the spatial objects and the primary key pointers of the spatial objects, that is, $C_1=(R, object\_id)$.

However, for the non-leaf node $C_n$, the two improved Hilbert R-trees both additionally store the minimum Hilbert value on the basis of the original structure of the non-leaf nodes of the dynamic Hilbert R-tree. Therefore, the information stored in each non-leaf node is the minimal bounding rectangles of all children nodes of the node, a set ptr of primary key pointers of all children nodes of the node, the maximum Hilbert value maxLHV of all spatial objects in the minimal bounding rectangle R and the minimum Hilbert value minLHV of all spatial objects in the minimal bounding rectangle R, that is, $C_n=(R,ptr,maxLHV,minLHV)$.

Figure 2:
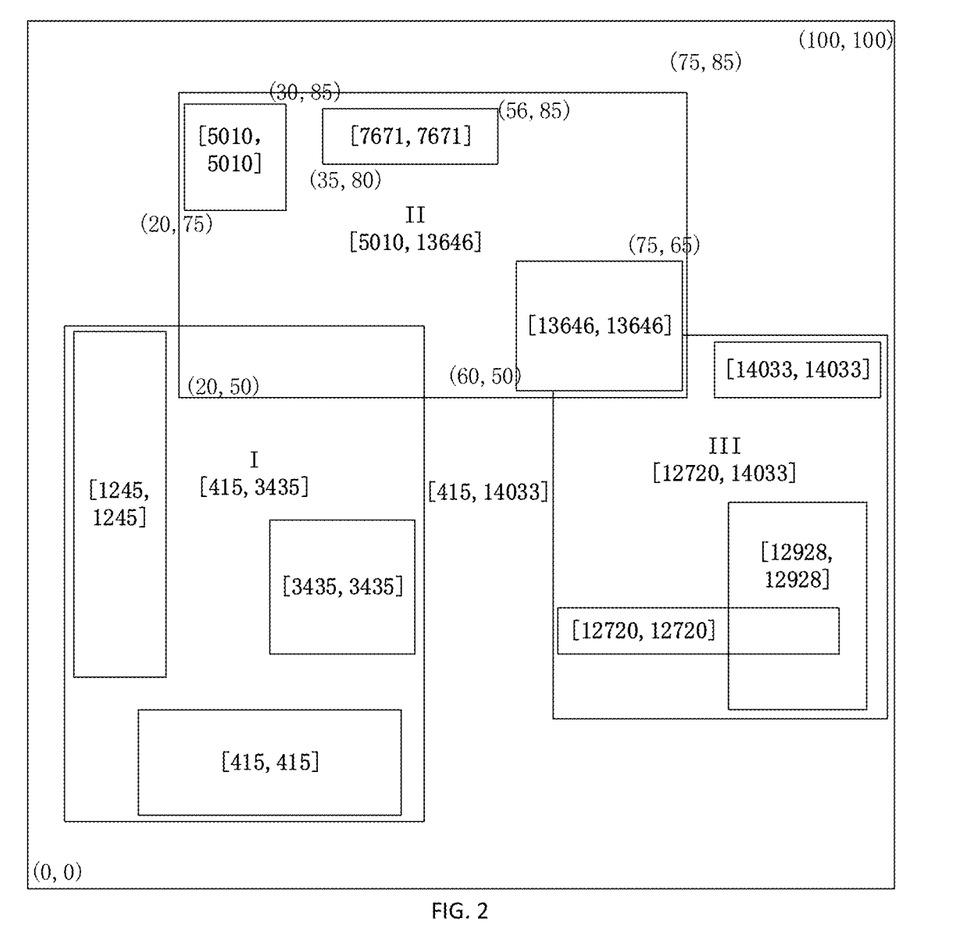
FIG. 2 illustrates the structure of an improved Hilbert r-tree.

As shown in FIG. 2, which is a schematic diagram of the structure of an improved Hilbert R-tree, it can be seen that node I, node II and node III are three non-leaf nodes. Taking the node II as an example, which contains three spatial objects with Hilbert values of 5010, 7671 and 13646 respectively, the maximum Hilbert value maxLHV stored by node II is 13646 and the minimum Hilbert value minLHV is 5010. The root node contains node I, node II and node III, so the maximum Hilbert value LHV and the minimum Hilbert value minLHV that need to be stored in the root node are 14033 and 415, respectively.

In this improved Hilbert R-tree, by recording the Hilbert value range of all spatial objects under a node, the path of the spatial objects under this node in the non-leaf node of the Hilbert R-tree to be inserted can be determined, and it is not necessary to query each spatial object to be inserted of from the root node. Therefore, the number of times of reading and writing disks can be reduced, and the merging efficiency can be improved.

In the improved Hilbert R-tree in the present application, there are many ways to calculate the Hilbert value of the minimal bounding rectangle: 1) Hilbert value calculation by taking the center point of the rectangle as the two-dimensional point; 2) Hilbert value calculation by taking the coordinates in the lower left corner and the coordinates in the upper right corner as the four-dimensional points; 3) Hilbert value calculation by taking the center of the rectangle and the distances $d_x$ and $d_y$ from the center to the boundary of the rectangle as the four-dimensional points. Different Hilbert value calculation methods will produce a variety of aggregation situations.

In this embodiment, it is preferable that the one-dimensional coded value of the two-dimensional coordinate of the center point of the minimal bounding rectangle of a spatial object on the Hilbert curve is taken as the Hilbert value of each spatial object. The encoding process of the Hilbert value can adopt any existing technology. In order to facilitate understanding, the following encoding process is provided.

If the order of the Hilbert curve is n, the coordinates of spatial data are x and y;

In Step 1, the two-dimensional coordinates x and y of the center point of the minimal bounding rectangle are read, and the values of x and y are converted into binary values with a length of 2n, which are expressed by $x^B$ and $y^B$.

In Step 2, one bit of binary values is respectively extracted from $x^B$ and $y^B$ in order for combination to obtain binary value segments, wherein the $i^{th}$ group of binary value segments are recorded as $x_i^B y_i^B$.

In Step 3, all binary value segments are converted, in which '00' is converted into 00, '01' is converted into 01, '10' is converted into 11, and '11' is converted into 10.

In Step 4, all the converted binary value segments are reorganized in order to obtain a complete binary value, which is then converted into a decimal value, that is, the Hilbert value.

In addition, for the convenience of understanding, the construction process of a Hilbert R-tree is described below, but it should be noted that the construction process of a R-tree is not a necessary step of the present application, and the present application can be used to merge the already constructed R-trees. The construction process of a Hilbert R-tree is as follows:

In S11, all spatial objects are arranged in an ascending order of the Hilbert values.

In S12, first c spatial objects are extracted according to the capacity c of each node of the R-tree to construct a first leaf node of an R-tree, then the next c spatial objects are extracted to construct a next leaf node; the process is repeated until all spatial objects are extracted to obtain k leaf nodes, and the k leaf nodes are added into a first-in first-out queue according to a node construction order.

In S13, non-leaf nodes are constructed level by level according to an order from the leaf node to the root node; for each level of the non-leaf nodes, the first c nodes are extracted from the first-in first-out queue of a child node level thereof to construct a first non-leaf node, and then the first c nodes are extracted from the first-in first-out queue again to construct a next non-leaf node; the process is repeated until all the nodes in the first-in first-out queue are taken to obtain a current non-leaf node level, and all non-leaf nodes in the current on-leaf node level are added to a new first-in first-out queue according to the node construction order for the construction of the next level of non-leaf nodes.

In S2, query is carried out level by level in an order from a root node level to a leaf node level based on Hilbert value information stored in each node to obtain a node to be inserted, in a leaf node level of the second R-tree, for each merged leaf node in a leaf node level of the first R-tree. In the process of query, the principle of determining the node to be inserted is that the Hilbert value range of the merged node shall fall completely into the Hilbert value range of the node to be inserted as far as possible.

In this embodiment, the query process in S2 adopts a "top to bottom" hierarchical query algorithm, and the specific implementation process of the hierarchical query algorithm is as follows:

In S21, a level n of a node level currently to be searched in the first R-tree is set to 1, and a level m of a node level currently to be searched in the second R-tree is set to 1; a height of the first R-tree is $H_1$ and a height of the second R-tree is $H_2$; the first node levels of the first R-tree and the second R-tree are both root node, and the root node of the second R-tree is used as the node to be inserted corresponding to the root node of the first R-tree.

In S22, a set $X_i^{n+1}$ of all child nodes of each node $x_i^n$ is respectively acquired for a $n^{th}$ level of nodes in the first R-tree, and meanwhile a set $Y_i^{n+1}$ of all child nodes of the node to be inserted corresponding to a node $x_i^n$ is acquired form the second R-tree; for each node $x_i^{n+1}$ contained in the set $X_i^{n+1}$, a pointer A of the first node with a maximum Hilbert value greater than $minLHV_i$ is searched in all nodes contained in the set $Y_i^{n+1}$ according to the maximum Hilbert value $maxLHV_i$ and the minimum Hilbert value $minLHV_i$ stored in a node $x_i^{n+1}$, and a pointer B of the first node with a maximum Hilbert value greater than $maxLHV_i$ is searched in all nodes contained in the set $Y_i^{n+1}$; a node with a pointer value in an interval [A,B] in the set $Y_i^{n+1}$ is taken as the node to be inserted for the node $x_i^n$.

when S22 is executed, among all the nodes contained in the set $Y_i^{n+1}$, the nodes corresponding to pointer A and pointer B can be searched by means of binary search;

in S23, 1 is respectively added to the values of n and m, and then repeating S22;

in S24, S23 is repeated until the values of n and m are both $H_1$, so as to obtain the node to be inserted, in the second R-tree, corresponding to each leaf node in the first R-tree;

in S25, a judgment process is continuously executed, and if $m<H_2$, the value of n is kept unchanged, 1 is added to the value of m, and S22 is repeated; query is completed until $m=H_2$, so that a corresponding node to be inserted is found in the leaf node level of the second R for each merged leaf node in the leaf node level of the first R.

In this hierarchical query algorithm, the first execution of step S22 corresponds to query for the node to be inserted of the root node. Firstly, the root node of $R_1$ is read to obtain the set $X_i^2$ of its child nodes, and the subscript i represents the $i^{th}$ node, the same below. Based on the characteristics of improved Hilbert R-tree nodes, the nodes in the set $X_i^2$ store the Hilbert value range of the spatial objects under the node. For each node $x_i^2$ in the set $X_i^2$, the first child node pointer with maxLHV greater than $minLHV_i$ in the child node set $Y_i^2$ of root node of $R_2$ tree is calculated by binary search according to its minimum Hilbert value $minLHV_i$ and maximum Hilbert value $LHV_i$, and is recorded as $fromPage_i$. Similarly, the first child node pointer with maxLHV greater than $LHV_i$ is in the child nodes $Y_i^2$ of root node of $R_2$ tree is calculated, and is recorded as $toPage_i$. It can be seen that the location of the disk page where the spacial object in the node $x_i^2$ needs to be inserted satisfies $fromPage_i \leq page \leq toPage_i$, that is, it is inserted into the node within the range $fromPage_i$ to $toPage_i$. $fromPage_i$ and $toPage_i$ of each node in the set $X_i^2$ are calculated, and at this time, a pointer to the inserted position node in the root node of $R_2$ tree is found for each node in the second level of $R_1$ tree. In the subsequent S23, the node at the second level in the $R_2$ tree is found according to the pointer value, and then the position of the node at the third level of the $R_1$ tree corresponding to the node at the third level of the $R_2$ tree is found in the same way as above. In this way, the hierarchical search is carried out until the hierarchical level reaches the spatial object corresponding to the leaf child node of the $R_1$ tree, then the $R_1$ tree can no longer search downward for subdivision, but the $R_2$ tree continues to search downward to the leaf node in the process of S24, and the spatial objects in the corresponding $R_1$ tree are inserted into the leaf node in batches.

In S3, according to an order of the Hilbert values, the spatial object included in each leaf node in the first R-tree is inserted into the node to be inserted that is determined in S2, thereby merging the two R-trees; if a capacity of the leaf node overflows during the merging process, the second R-tree needs to be split, and all spatial objects contained in the first R-tree and the second R-tree are redistributed to all leaf nodes of the split second R-tree according to the order of Hilbert values.

The node splitting method for the second R-tree can be implemented according to the node index splitting method in the prior art. In this embodiment, a "bottom to top" hierarchical adjustment algorithm is provided to facilitate the node index splitting for the second R-tree, which is as shown in S31 to S33:

In S31, the number of overflow objects in a total number of all spatial objects contained in the first R-tree and the second R-tree relative to a node capacity of the second R-tree is calculated.

In S32, the leaf nodes of the second R-tree are split, and the least additional leaf nodes for accommodating all overflow objects are constructed.

In S33, all spatial objects contained in the first R-tree and the second R-tree are arranged in an ascending order of the Hilbert values, and then the spatial objects are redistributed to each leaf node of the second R-tree after splitting.

In S34, the node capacity overflow of each level of non-leaf nodes of the second R-tree is judged according to a level-by-level adjustment order from the leaf node level to the root node level, the nodes of a non-leaf level are split if node capacity overflow occurs in the level, and all the child nodes of the non-leaf nodes of the level are redistributed to the non-leaf nodes of the level after splitting; finally, node splitting of the second R-tree is completed after adjustment of the root node.

According to this method, insertion and splitting of spatial object data are achieved for all the leaf nodes in the last level, and then the non-leaf nodes in the upper level are adjusted upwards. With the splitting of nodes in the leaf node level, the number of nodes will increase, which may lead to the overflow of non-leaf nodes in the penultimate level Therefore, the node of the penultimate level is then adjusted, and the node is split in the same way until the root node is adjusted. If the capacity of the root node overflows, the root node is split into two nodes, and one root node is reconstructed with these two nodes as child nodes.

It should be noted that in the process of merging two R-trees, when the spatial objects of the first R-tree are inserted into the nodes to be inserted in the second R-tree, they should be inserted according to the order of the Hilbert values, so as to ensure that all spatial objects in each leaf node are arranged in an ascending order of the Hilbert values, and all leaf nodes as a whole are also arranged in an ascending order according to the maximum Hilbert value.

In S4, since the spatial objects stored in the node will change after merging and splitting, and the information stored in the node will change, it is necessary to update the information stored in each node level by level according to an order from the leaf node to the root node for the second R-tree after merging with the first R-tree. For a leaf node, the information stored to be updated includes the minimal bounding rectangles R of the spatial objects and the primary key pointer object_id; for a non-leaf node, the information stored to be updated includes the minimal bounding rectangle R of the spatial object, the primary key pointer set prt, the maximum Hilbert value maxLHV and the minimum Hilbert value minLHV.

In order to further illustrate the technical effect of the present application, the following shows the effect of the R-tree index merging and updating method based on a Hilbert curve on specific spatial data based on a specific case.

Figure 3:
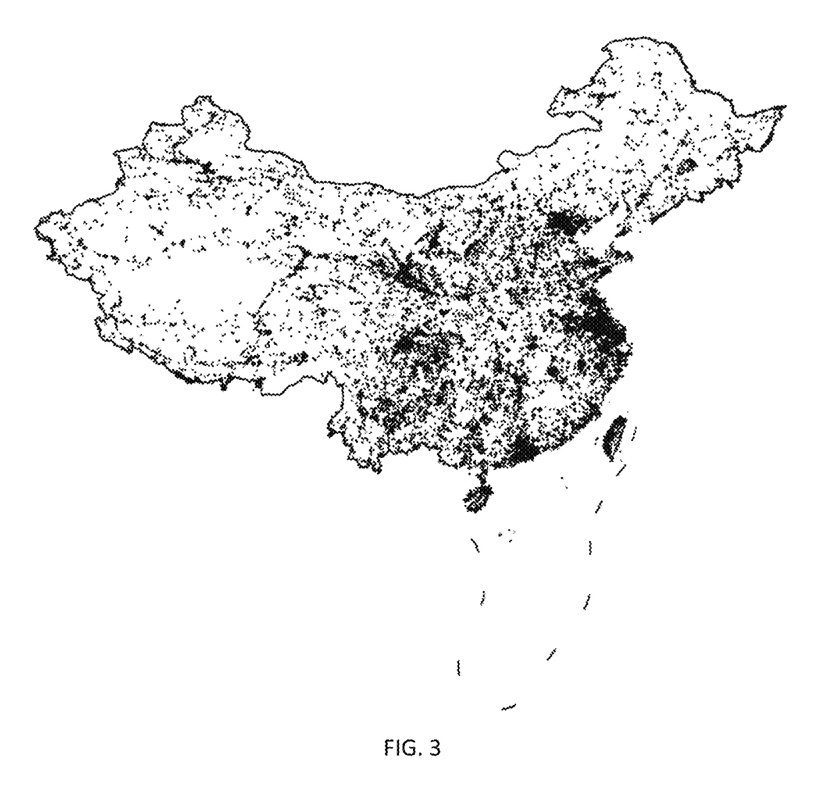
FIG. 3 illustrates a diagram showing experimental data.

Example:

The steps of this example are the same as those mentioned above in the specific embodiment, namely steps S1 to S4, and step S2 is specifically realized by steps S21 to S25, and step S3 is specifically realized by steps S31 to S34, which will not be repeated here. Here are some implementation processes and results:

In this embodiment, the planar spatial data type is taken as the research object, and the data is all China building area data downloaded from OpenStreetMap, with a total of 1,000,192 elements. FIG. 3 shows the spatial data of the research object. As can be seen from the figure, the spatial data have different sizes and uneven distribution, and the density of the data is random to some extent, which can be used as experimental samples.

50 groups of data are randomly selected from 1000 to 50000 records, and the improved R-tree index, conventional R-tree index and Hilbert R-tree index are updated based on a Hilbert curve to verify the efficiency of the improved Hilbert R-tree merging algorithm of the present application, and the merged query efficiencies are compared. It is confirmed that the LH R-tree merging algorithm can ensure better spatial aggregation and higher query efficiency.

Figure 4:
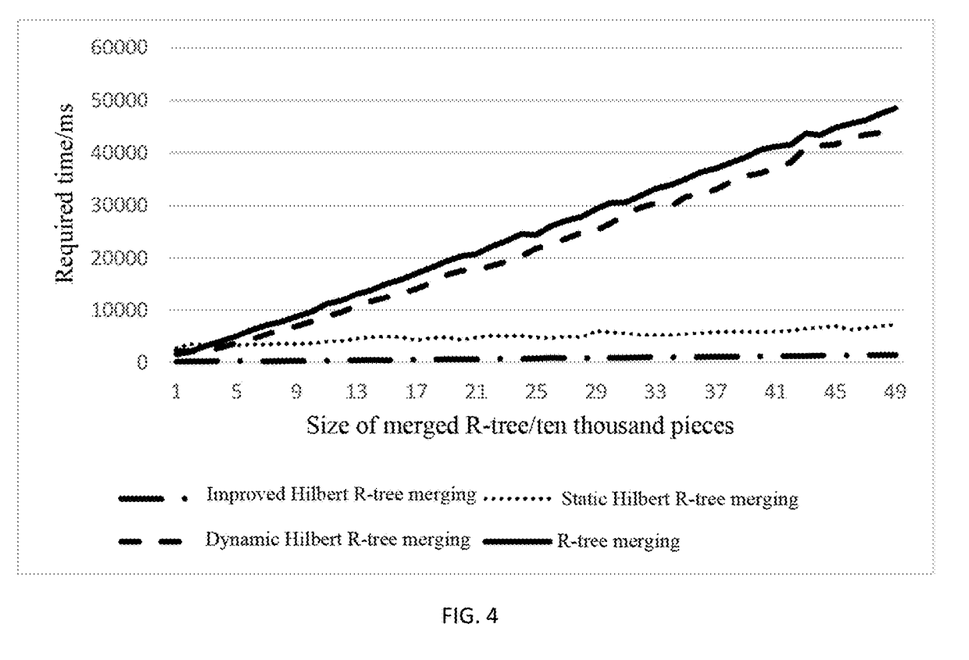
FIG. 4 illustrates a line chart comparing the times of merging a R-tree with R-trees with different data volumes.

In FIG. 4, the horizontal axis represents the size of the merged R-tree, and the vertical axis represents the time required for merging the R-trees. In the line chart, from top to bottom, the yellow broken line represents the time required for the conventional R-tree merging, the gray broken line represents the time required for the dynamic Hilbert R-tree merging, the orange broken line represents the time required for the static Hilbert R-tree merging, and the blue broken line represents the time required for the improved Hilbert R-tree merging of the present application. As can be seen from the figure, the dynamic Hilbert R-tree merging mode is superior to the conventional one, the improved Hilbert R-tree merging mode is superior to the static Hilbert R-tree merging mode, and the time required for improving the Hilbert R-tree merging mode and the static Hilbert R-tree merging mode is obviously less than the two modes of one-by-one inserting and merging.

Figure 5:
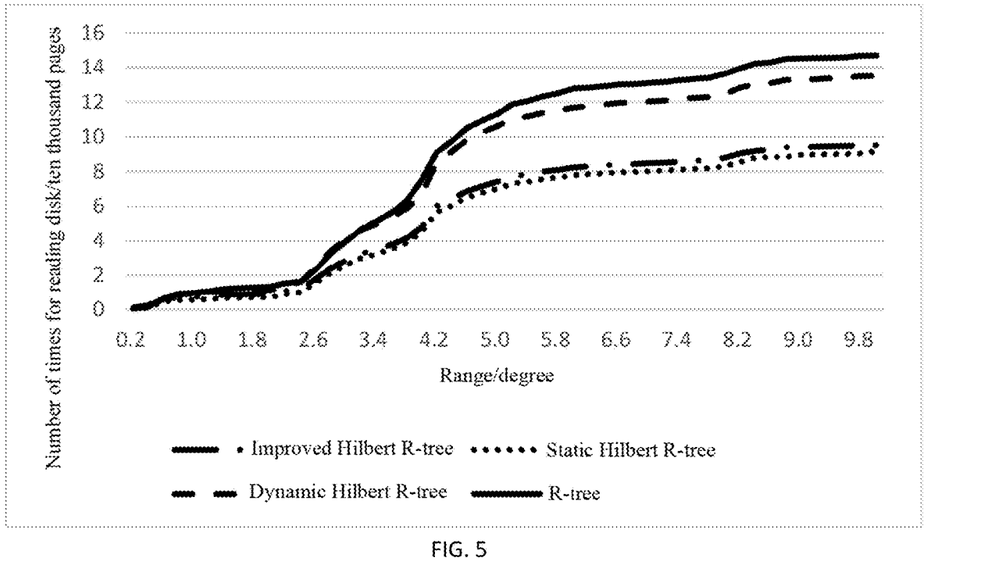
FIG. 5 illustrates a line chart comparing the query efficiencies of a R-tree spatial range.

In FIG. 5, the horizontal axis represents the range of the search rectangle in latitude and longitude, and the vertical axis represents the number of times of reading R-tree disks in ten thousand pages. In R-tree query, when the query range is small, the query speed is faster and the query time error value is larger. Since the speed of reading and writing from the disk is much faster than that of searching the memory, the number of times of reading the disk pages can be used instead of the range query time. In this experiment, the number of times of reading from the disk is used as the basis for comparing the query efficiency. In the figure, from top to bottom, the efficiency line graph of a conventional R-tree spatial query, the efficiency line graph of a dynamic Hilbert R-tree spatial query, the efficiency line graph of an improved Hilbert R-tree spatial query and the query line graph of a static Hilbert R-tree spatial respectively displayed. As can be seen from the figure, the spatial query efficiencies of the four R-trees are generally consistent with the increase of the spatial range. However, the query efficiency of the dynamic Hilbert R-tree is better than that of the conventional R-tree, which shows that the spatial aggregation of the Hilbert R-tree is better than that of the conventional R-tree. The query efficiency of the R-tree obtained by the batch merging algorithm is obviously better than the above two R-trees, and the efficiency of the static Hilbert R-tree is slightly better than that of the improved Hilbert R-tree. However, the average query efficiency of the improved Hilbert R-tree compared with the R-tree is improved by 52%, the average query efficiency of the dynamic Hilbert R-tree is improved by 41%, and the query efficiency of the static Hilbert R-tree is reduced by 5%.

In addition, in other embodiments, an R-tree index merging and updating apparatus based on a Hilbert curve can also be provided, which includes a memory and a processor;

the memory is used for storing a computer program;

the processor is used for implementing the R-tree index merging and updating method based on a Hilbert curve when executing the computer program.

In addition, in other embodiments, a computer-readable storage medium on which a computer program is stored can further be provided, and when the computer program is executed by a processor, the aforementioned R-tree index merging and updating method based on a Hilbert curve can be implemented.

The example described above is only a preferred solution of the present application, but it is not intended to limit the present application. Those skilled in the relevant technical field can make various changes and modifications without departing from the spirit and scope of the present application. Therefore, all technical solutions obtained by equivalent substitution or equivalent transformation shall fall within the protection scope of the present application.

What is claimed is:

1. An R-tree index merging and updating method based on a Hilbert curve, comprising:

step S1, acquiring a first R-tree to be merged and a second R-tree into which the first R-tree is to be inserted, wherein a height of the first R-tree is not greater than a height of the second R-tree, and wherein in each R-tree, information stored in each leaf node comprises minimal bounding rectangles of spatial objects and primary key pointers of the spatial objects, and stored information in each non-leaf node comprises a minimal bounding rectangle of all child nodes, a primary key pointer set of all child nodes, a maximum Hilbert value of all spatial objects in the minimal bounding rectangle and a minimum Hilbert value of all spatial objects in the minimal bounding rectangle;

step S2, querying and obtaining, according to a level-by-level querying order from a root node level to a leaf node level based on Hilbert value information stored in each node, a node to be inserted into a leaf node level of the second R-tree from each merged leaf node in a leaf node level of the first R-tree;

step S3, inserting, according to an order of the Hilbert values, spatial objects contained in each leaf node in the first R-tree into the node to be inserted in the step S2, to merge the first R-tree and the second R-tree, and in case a capacity of a leaf node overflows when merging, splitting the second R-tree, and redistributing all spatial objects contained in the first R-tree and the second R-tree to all leaf nodes of the split second R-tree according to the order of Hilbert values; and step S4, updating, according to an order from a leaf node to a root node, the stored information in each node level by level for the second R-tree merged with the first R-tree.

2. The R-tree index merging and updating method based on the Hilbert curve according to claim 1, wherein in the R-trees, a Hilbert value of each spatial object is a one-dimensional coded value of a two-dimensional coordinate of a center point of a minimal bounding rectangle of the each spatial object on the Hilbert curve.

3. The R-tree index merging and updating method based on a Hilbert curve according to claim 1, wherein the R-trees are constructed as follows:

sub-step S11, arranging all spatial objects in an ascending order of the Hilbert values;

sub-step S12: extracting, according to a capacity c of each node of the R-tree, first c spatial objects to construct a first leaf node of an R-tree, extracting next c spatial objects to construct a next leaf node, repeating until all spatial objects are extracted to obtain k leaf nodes, and adding, according to a node construction order, the k leaf nodes into a first-in first-out queue; and sub-step S13, constructing non-leaf nodes level by level according to an order from a leaf node to a root node, extracting first c nodes from the first-in first-out queue of a child node level of the non-leaf nodes, for each level of the non-leaf nodes, to construct a first non-leaf node, extracting first c nodes from the first-in first-out queue again to construct a next non-leaf node; repeating until all the nodes in the first-in first-out queue are taken out, to obtain a current non-leaf node level, and adding, according to the node construction order, all non-leaf nodes in the current non-leaf node level to a new first-in first-out queue for the construction of a next level of non-leaf nodes.

4. The R-tree index merging and updating method based on a Hilbert curve according to claim 1, wherein the S2 is implemented as follows:

sub-step S21, setting a level n of a node level currently to be searched in the first R-tree to 1, and setting a level m of a node level currently to be searched in the second R-tree to 1, wherein a height of the first R-tree is $H_1$ and a height of the second R-tree is $H_2$; a first node level of the first R-tree and a first node level of the second R-tree are both root nodes, and a root node of the second R-tree is used as a node to be inserted corresponding to a root node of the first R-tree;

sub-step S22, acquiring a set $X_i^{n+1}$ of all child nodes of each node $x_i^n$ for a $n^{th}$ level of nodes in the first R-tree, respectively, and acquiring a set $Y_j^{n+1}$ of all child nodes of a node to be inserted into a node $x_i^n$ obtained from the second R-tree, searching, according to a maximum Hilbert value $maxLHV_j$ and a minimum Hilbert value $minLHV_j$ stored in a node $x_j^{n+1}$, for a pointer A of a first node with a maximum Hilbert value greater than the minimum Hilbert value $minLHV_j$ in all nodes contained in the set $Y_j^{n+1}$ for each node $x_j^{n+1}$ contained in the set $X_i^{n+1}$, and searching for a pointer B of a first node with a maximum Hilbert value greater than the maximum Hilbert value $maxLHV_j$ in all nodes contained in the set $Y_j^{n+1}$, wherein a node with a pointer value in an interval [A,B] in the set $Y_j^{n+1}$ is taken as the node to be inserted into the node $x_i^n$;

sub-step S23, adding 1 to values of n and m, respectively, and repeating the sub-step S22;

sub-step S24, repeating the sub-step S23 until the values of n and m are both $H_1$ to obtain the node to be inserted in the second R-tree corresponding to each leaf node in the first R-tree; and sub-step S25, executing determining continuously, when $m<H_2$, keeping the value of n unchanged, adding 1 to the value of m, and repeating the sub-steps S22, and completing query until $m=H_2$, in such a manner that a node to be inserted is found in the leaf node level of the second R-tree corresponding to each merged leaf node in the leaf node level of the first R-tree.

5. The R-tree index merging and updating method based on a Hilbert curve according to claim 4, wherein the sub-step S22 comprises searching the nodes corresponding to the pointer A and the pointer B among all nodes contained in the set $Y_j^{n+1}$ by binary search.

6. The R-tree index merging and updating method based on a Hilbert curve according to claim 1, wherein in the sub-step S3, when leaf node capacity overflows when the two R-trees are merging, overflowed node is split as follows:

sub-step S31, calculating a number of overflown objects in a total number of all spatial objects contained in the first R-tree and the second R-tree relative to a node capacity of the second R-tree;

sub-step S32, splitting the leaf nodes of the second R-tree, and constructing least additional leaf nodes for accommodating all overflown objects;

sub-step S33, arranging all spatial objects contained in the first R-tree and the second R-tree in an ascending order of Hilbert values, and redistributing the spatial objects to each split leaf node of the second R-tree; and sub-step S34, determining node capacity overflow of each level of non-leaf nodes of the second R-tree according to a level-by-level adjustment order from the leaf node level to the root node level, when node capacity of a non-leaf node level overflows, splitting nodes of the non-leaf node level, redistributing all the child nodes of the non-leaf node level to the split nodes of the non-leaf node level, and completing node splitting of the second R-tree after adjustment of the root node.

7. The R-tree index merging and updating method based on a Hilbert curve according to claim 6, wherein in the sub-step S34, when node capacity of the root node overflows, the root node is split into two nodes, and a root node is reconstructed by taking the two nodes as child nodes.

8. The R-tree index merging and updating method based on a Hilbert curve according to claim 6, wherein in the sub-step S3, after merging the two R-trees, the spatial objects in each leaf node are arranged in an ascending order according to Hilbert values.

* * * * *